United States Patent [19]

Inoue

[11] Patent Number: 4,796,204
[45] Date of Patent: Jan. 3, 1989

[54] OIL DEGRADATION WARNING SYSTEM
[75] Inventor: Ryuzaburou Inoue, Yamato, Japan
[73] Assignee: Nissan Motor Co., Ltd., Yokohama, Japan
[21] Appl. No.: 772,928
[22] Filed: Sep. 5, 1985
[30] Foreign Application Priority Data Sep. 7, 1984 [JP] Japan .................. 59-186547

[51] Int. Cl.$^4$ ............................................. G01D 1/00
[52] U.S. Cl. .................. 364/550; 123/198 D; 123/196 S; 73/117.3; 340/52 R
[58] Field of Search ............ 364/550, 551, 552, 431.01, 364/431.03; 73/10, 64, 117.2, 117.3; 340/52 R; 123/196 S, 198 D; 184/1.5, 6.5–6.8

[56] References Cited

U.S. PATENT DOCUMENTS

| 4,007,629 | 2/1977 | Hochstein | 73/64 |
| 4,306,525 | 12/1981 | Faxvog | 123/196 S |
| 4,506,337 | 3/1985 | Yasuhara | 364/550 |
| 4,525,782 | 6/1985 | Wohlfarth et al. | 364/431.01 |
| 4,533,900 | 8/1985 | Muhlberger et al. | 364/569 |
| 4,677,847 | 7/1987 | Sawatari et al. | 73/117.3 |

FOREIGN PATENT DOCUMENTS 0191458 8/1986 European Pat. Off. ......... 123/196 S

Primary Examiner—Parshotam S. Lall
Assistant Examiner—S. A. Melnick
Attorney, Agent, or Firm—Foley & Lardner, Schwartz, Jeffery, Schwaab, Mack, Blumenthal & Evans

[57] ABSTRACT

Herein disclosed in an oil degradation warning system which comprises several sensors for sensing parameters which are closely related to degradation factors of the engine oil, a microcomputer which processes the detected parameters to compute oil degradation coefficients of them in each factor, integrates the oil degradation coefficients in each factor with passage of time, and issues an instruction signal when at least of the integrated values of the oil degradation coefficients exceeds a corresponding reference value, and a warning device which gives a warning when the instruction signal is applied thereto.

5 Claims, 3 Drawing Sheets

4,796,204

OIL DEGRADATION WARNING SYSTEM

BACKGROUND OF THE INVENTION

1. Field of the Invention

The present invention relates in general to a warning system of a motor vehicle, and more particularly to a so-called "oil degradation warning system" which automatically gives a visual or audible warning when the engine oil has been degraded to a certain unusable degree.

2. Description of the Prior Art

As is known, engine oil functions not only to lubricate movable metal parts, such as pistons or the like, but also to remove heat from heated parts of the engine. However, long use of the engine oil degrades the nature thereof and thus prevents the oil from exhibiting satisfied lubrication and heat removing functions.

In view of the above, several kinds of oil degradation warning systems have been hitherto proposed, which, by using intake vacuum, oil temperature, and engine speed and/or moved distance as parameters for estimating the degradation degree of the engine oil, calculate the time (viz., the oil change time) when the oil soould be changed with new or fresh one and give a visual or audible warning at that time. Some of them are disclosed in Japanese Patent Application First Provisional Publications Nos. 59-27260 and 59-43299.

However, in these hitherto proposed systems, the parameters as mentioned hereinabove are "totally" treated for calculating the oil change time, so that it inevitably occurs that the oil change time is calculated with noticeable error. Thus, in such systems, it sometimes occurs that the warning is given considerably before or after the time when the oil change is practically necessary.

SUMMARY OF THE INVENTION

It is therefore an object of the present invention to provide an oil degradation warning system which can precisely calculate the oil exchange time and gives a warning at just the time when the oil exchange is practically necessary.

According to the present invention, there is provided an oil degradation warning system which comprises first means for detecting a plurality of parameters which are closely related to degradation factors of the engine oil; second means for processing the parameters to provide oil degradation coefficients of the parameters in each factor and integrating the oil degradation coefficients in each factor with passage of time; third means for issuing an instruction signal when at least one of the integrated values of the oil degradation coefficients exceeds a corresponding reference value; and fourth means for giving a warning when the instruction signal is applied thereto.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

As will become apparent as the description proceeds, in accordance with the present invention, the degree of oil degradation is estimated from three major factors, which are the viscosity of oil, the basicity of oil and the amount of infusible matters in oil. Because of difficulty in directly measuring these factors in consequence manner, the present invention uses the oil temperature, the engine speed and the engine load as parameters for estimating these factors, that is, for estimating the degree of oil degradation.

Figure 1:
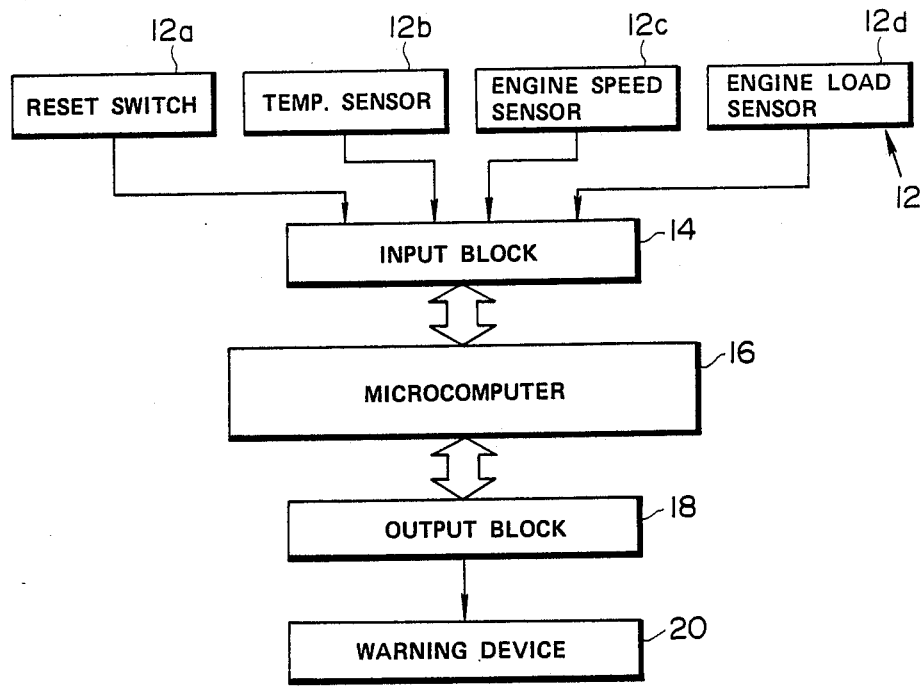
FIG. 1 is a block diagram of an electric circuit employed in an oil degradation warning system of the present invention.

Referring to FIG. 1, there is shown a block diagram of the oil degradation warning system 10 according to the present invention. As is seen from the drawing, the system 10 comprises generally a sensor block 12, an input block 14, a microcomputer block 16, an output block 18 and a warning block 20.

The sensor block 12 includes a reset switch 12a, an oil temperature sensor 12b, an engine speed sensor 12c and an engine load sensor 12d. The reset switch 12a is constructed to issue a reset signal when oil change is practically carried out in the associated engine. The oil temperature sensor 12b is a sensor for detecting the temperature of the engine oil contained in the cylinder block of the engine. The engine speed sensor 12c is a sensor for detecting the rotation speed of the engine. A known crank-angle sensor may be used therefor. The engine load sensor 12d is a sensor for detecting a load applied to the engine, which is, for example, an intake vacuum sensor mounted to the intake part of the engine. If desired, the engine load may be determined by computing signals issued from an air flow rate sensor (not shown) and a next-mentioned engine speed sensor.

As will become apparent hereinafter, the oil temperature sensor 12b, the engine speed sensor 12c and the engine load sensor 12d detect three parameters (viz., oil temperature, engine speed.and engine load) which are closely related to the degradation factors of the engine oil.

Figure 3:
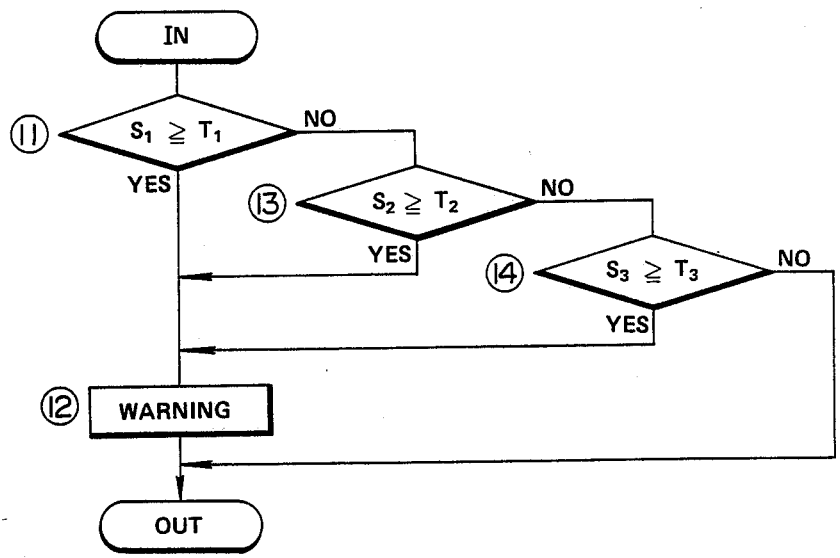
FIGS. 2 and 3 are flowcharts for carrying out a program set in the oil degradation warning system of the present invention.
Figure 2:
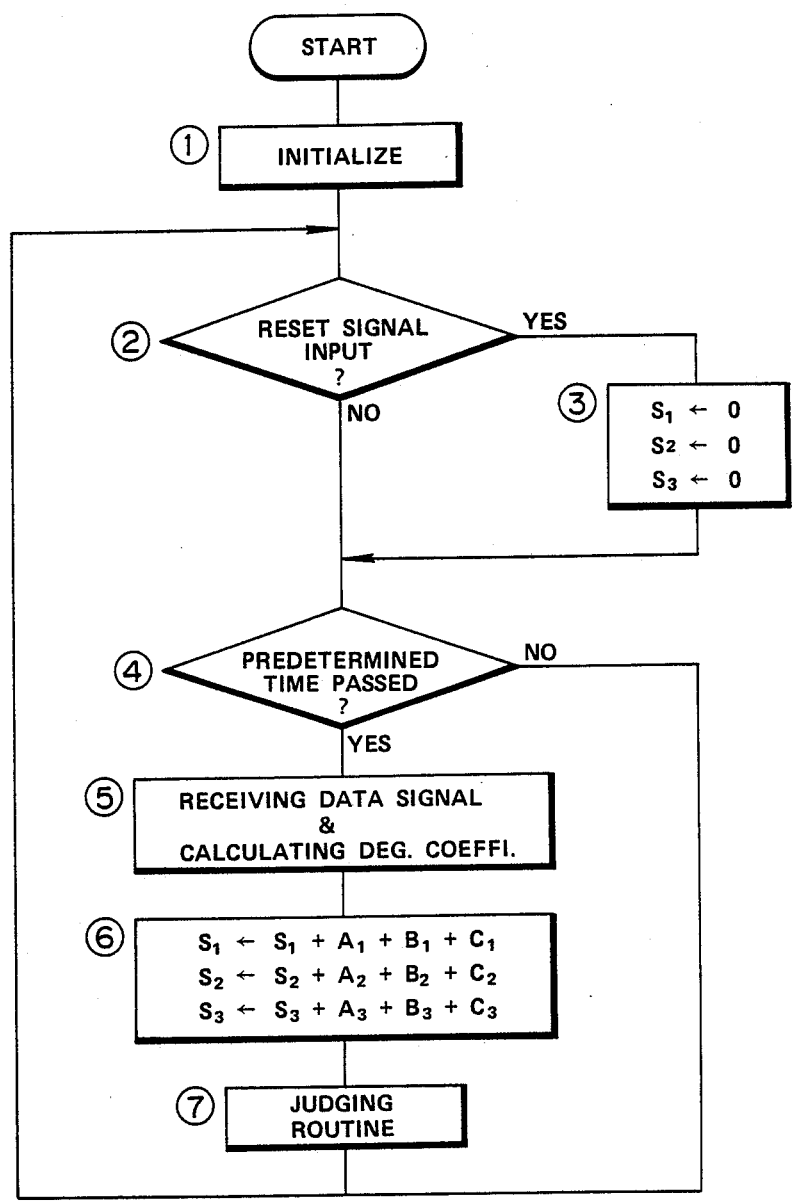

Receiving the information signals from the oil temperature sensor 12b, the engine speed sensor 12c and the engine load sensor 12d through the input block 14, the microcomputer 16 calculates the oil degradation coefficents of the parameters in each factor and adds and integrates the calculated degradation coeffecients in each factor with passage of time and if at least one of the integrated values exceeds a corresponding reference value which has been predetermined, the microcomputer 16 issues an output signal to the output block 18. These operations are carried out in accordance with a given program which is depicted by the flowcharts of FIGS. 2 and 3. The program is set in a ROM in the microcomputer 16. The computer 16 includes a nonvolatile RAM which can memorize the current data even when an ignition switch of the engine is turned off.

The warning block 2 comprises an indicator which issues a visual or audible warning when the microcomputer 16 issues an output signal to the output block 18.

In the following, the given program will be described with reference to the flowcharts shown in FIGS. 2 and 3.

When an ignition switch (not shown) of the associated engine is turned on, the program starts.

At STEP 1, the content of the memory is initialized, and the operation flow goes to STEP 2 where a judgement as to whether or not a reset signal from the reset switch 12a is inputted thereto is carried out. That is, when, due to completion of oil change, the reset switch 12a is actuated, a reset signal is issued from the reset switch 12a and applied to the microcomputer 16 through the input block 14. With this, the operation flow goes to STEP 3 where the integrated values of $S_1$, $S_2$ and $S_3$ are each reset to zero (viz., 0).

It is to be noted that $S_1$ is the integrated value of oil degradation coefficient dependent on viscosity of oil, and $S_2$ and $S_3$ are those dependent on basicity of oil and amount of infusible matters in oil, respectively. This will become clear hereinafter.

Once the reset signal is applied to the circuit, subsequent operation flow goes to STEP 4 without passing through STEP 3. This continues until another oil change is practically carried out.

At STEP 4, a judgement as to whether or not a predetermined time has passed is carried out. This is done by a time counter included in the microcomputer 16. When the predetermined time has passed, the operation flow goes to STEP 5 where the data supplied from the oil temperature sensor 12b, the engine speed sensor 12c and the engine load sensor 12d are read. And, at this STEP, with reference to the correlations depicted by the graphs of FIGS. 4A to 6C, the viscosity dependent oil degradation coeffecients (viz., $A_1$, $B_1$ and $C_1$) of oil temperature, engine speed and engine load, the basicity dependent oil degradation coefficents (viz., $A_2$, $B_2$ and $C_2$) of oil temperature, engine speed and engine load, and infusible matter dependent oil degradation coefficients (viz., $A_3$, $B_3$ and $C_3$) of oil temperature, engine speed and engine load are calculated from the data issued from the sensors.

Now, the degradation of engine oil will be outlined from a viewpoint of viscosity, basicity and amount of infusible matters in the oil.

As is known, using the engine oil at high temperature hastens oxidation of the oil and thus increases the viscosity of the same. Further, adding any combusted product, such as blowby gas, into the oil incresses the viscosity of the same. On the contrary, adding fuel (gasoline) into the oil reduces the viscocity of the oil. Furthermore, when the oil is stirred vigorously, the viscosity of the oil lowers because any viscosity increasing polymer contained therein is mechanically broken. This phenomenon becomes much severe when a so-called "multigrade oil" is used. As is known, too much lowering and too much increasing of the viscosity of the engine oil induce poor lubrication of the moving metal parts, which sometimes brings about the undesirable piston seizure of the engine. Considering these phenomena, the graphs of FIGS. 4A, 4B and 4C are provided.

Figure 4A:
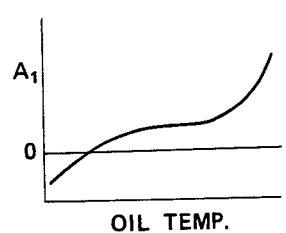
FIGS. 4A, 4B and 4C are graphs which show respectively the viscosity dependent oil degradation coefficients of oil temperature, engine speed and engine load.
Figure 4B:
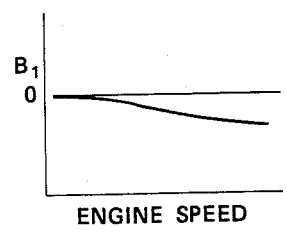
Figure 4C:
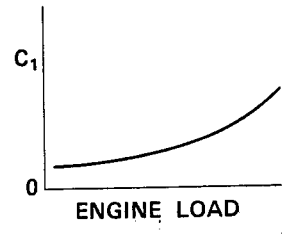

FIGS. 4A, 4B and 4C show the viscosity dependent oil degradation coefficients of oil temperature, engine speed and engine load. As is seen from FIG. 4A, when the oil temperature is high, the viscosity dependent oil degradation coefficient shows a high degree. This is because of increased oxidation of the oil per se. While, when the oil temperature is low, the coefficient is low. As is seen from FIG. 4B, with increase in engine speed, the viscosity dependent oil degradation coefficient lowers. This is because of the mechanical breakage of the viscosity increasing polmmer contained in the oil. As is seen from FIG. 4C, the viscosity ddependent oil degradation coefficient increases with increase in engine load. This is because of increase of blowby gas with increase in the engine load. (In case of Diesel engine, the amount of smoke increases as the engine load increases).

The oil basicity dependent oil degradation coefficients will be described next. The basicity represents the amount of remaining alkaline additives which neutralize acid matters such as combusted products of sulfer or the like. As is known, poor basicity causes corrosion of metal parts.

Figure 5A:
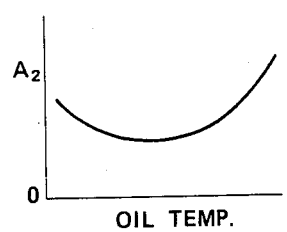
FIGS. 5A, 5B and 5C are graphs which show respectively the basicity dependent oil degradation coefficients of oil temperature, engine speed and engine load.
Figure 5B:
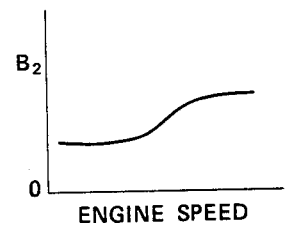
Figure 5C:
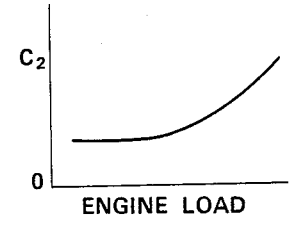

FIGS. 5A, 5B and 5C show the basicity dependent oil degradation coefficients of oil temperature, engine speed and engine load. As is seen from FIG. 5A, the basicity dependent oil degradation coefficient increases when the oil temperature is relatively low and relatively high. This is because, at low temperature, the oil tends to produce a sludge of metal oxide which reduces the basicity of the oil, while, at high temperature, the oxidation of the oil per se becomes active causing lowering of basicity. The basicity dependent oil degradation coefficients of the engine speed and the engine load have such corrllations as depicted by FIGS. 5B and 5C respectively.

Figure 6A:
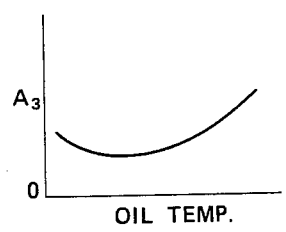
FIGS. 6A, 6B asnd 6C are graphs which show respectively the infusible matter dependent oil degradation coefficients of oil temperature, engine speed and engine load.
Figure 6B:
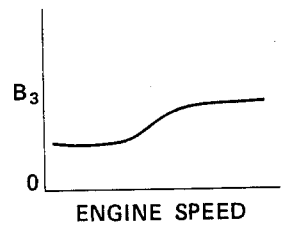
Figure 6C:
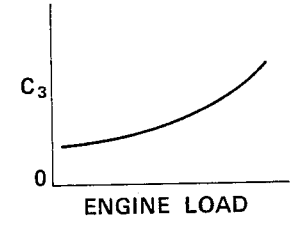

In the next, infusible matters in the oil will be described. Oxidation products, smoke and metal powders are the infusible matters. The infusible matter dependent oil degradation coefficients of the oil temperature, engine speed and engine load are depicted by FIGS. 6A, 6B and 6C, respectively. As is seen from FIG. 6A, the infusible matter dependent oil degradation coeffecient of oil temperature increases when the oil temperature is relatively low and relatively high. This is because, at low temperature, metal abrasion phenomenon becomes active, while, at high temperature, oxidation of the oil per se becomes active, both of which cause increase of the amount of the infusible matters in the oil. Regarding to the engine speed, the infusible matter dependent oil degradation coefficient has a nature as shown in FIG. 6B. That is, when the engine speed increases, the amount of blowby gas increases thereby increasing the amount of the infusible matters in the oil. As is seen from FIG. 6C, the infusible matter dependent oil degradation coefficient of the engine load increases with increase of the same. This is because, at high load of the engine, the amount of blowby gas (or smoke in Diesel engine) increases.

It is to be noted that the correlations shown by the graphs of FIGS. 4A to 6C are all memorized in the ROM of the microcomputer 16.

Returning back to FIG. 2, at STEP 6, the viscosity dependent oil degradation coeffecents (viz., $A_1$, $B_1$ and $C_1$), the basicity dependent oil degradation coefficients (viz., $A_2$, $B_2$ and $C_2$) and the infusible matter dependent oil degradation coneffficients (viz., $A_3$, $B_3$ and $C_3$) are each added, and the added values are added to previously integrated values $S_1$, $S_2$ and $S_3$ to provide up-to-date integrated values $S_1$, $S_2$ and $S_3$. Then, the operation flow goes to STEP 7 the detail of which is depicted by FIG. 3 which will be described hereinnext.

As is shown in FIG. 3, at STEP 11, a judgement as to whether or not the up-to-date integrated value $S_1$ is greater than or equal to a predetermined reference value $T_1$ is carried out. If YES, the operation flow goes to STEP 1 and a visual or audible warning is produced giving notice of necessity of oil change. If NO at STEP 11, the operation flow goes to STEP 13 where a judgement as to whether or not the up-to-date integrated value $S_2$ is greater than or equal to a predetermined reference value $T_2$ is carried out. If YES, the operation flow goes to STEP 12 and thus a warning is issued from the warning block 20. If NO at STEP 13, the operation flow goes to STEP 14 where a judgement as to whether or not the up-to-date integrated value $S_3$ is greater than or equal to a predetermined reference value $T_3$ is carried out. If YES, the operation flow goes to STEP 12 and thus a warning is given. If NO, the operation flow returns to STEP 2 bypassing the STEP 12.

As is described hereinabove, in accordance with the present invention, the oil degradation coeffecents of the three major parameters (viz., oil temperature, engine speed and engine load) dependent on viscosity of oil, basicity of oil and amount of infusible matters in oil are each integrated with pass of time, and if at least one of the up-to-date integrated values exceeds a corresponding reference value (viz., No Good line), a warning is issued indicating a need of oil change.

What is claimed is:

1. An oil degradation warning system comprising:
   first means for detecting a plurality of parameters which are related to a plurality of degradation factors of an engine oil, wherein said first means comprises an oil temperature sensor which senses the temperature of the engine oil, an engine speed sensor which senses the rotation speed of the engine, and an engine load sensor which senses a load applied to the engine, wherein said engine oil temperature, engine rotation speed and engine load sensor constitute said plurality of parameters;
   second means for processing said parameters and providing an oil degradation coefficient for each of said plurality of parameters and integrating each oil degradation coefficient in each factor with passage of time;
   third means for issuing an instruction signal when at least one of the integrated values of the oil degradation coefficients exceeds a corresponding reference value; and
   fourth means for providing a warning when said instruction signal is applied thereto, thereby indicating oil degradation.

2. An oil degradation warning system as claimed in claim 1, wherein said second means is initialized when an ignition switch of an associated engine is activated.

3. An oil degradation warning system as claimed in claim 1, in which the oil degradation factors are the viscosity of oil, the basicity of oil and the amount of infusible matters in oil.

4. An oil degradation warning system as claimed in claim 3, further comprising fifth means for resetting the integrated values of the oil degradation coefficients to zero after an oil change is carried out.

5. An oil degradation warning system as claimed in claim 4, further comprising sixth means, responsive to the operation of said fifth means, for judging whether or not a predetermined time passes after said fifth means resets the integrated values of the degradation coefficients and for enabling said second means after said predetermined time has passed.

* * * * *